United States Patent
Jiang

(10) Patent No.: US 12,317,302 B2
(45) Date of Patent: May 27, 2025

(54) COMMUNICATION PROCESSING METHOD AND DEVICE, AND COMPUTER STORAGE MEDIUM

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 368 days.

(21) Appl. No.: 17/904,638

(22) PCT Filed: Feb. 21, 2020

(86) PCT No.: PCT/CN2020/076233
§ 371 (c)(1),
(2) Date: Aug. 19, 2022

(87) PCT Pub. No.: WO2021/164011
PCT Pub. Date: Aug. 26, 2021

(65) Prior Publication Data
US 2023/0091685 A1 Mar. 23, 2023

(51) Int. Cl.
*H04W 72/541* (2023.01)
*H04W 24/02* (2009.01)
(Continued)

(52) U.S. Cl.
CPC ......... *H04W 72/541* (2023.01); *H04W 72/40* (2023.01); *H04W 24/02* (2013.01); *H04W 92/18* (2013.01)

(58) Field of Classification Search
None
See application file for complete search history.

(56) References Cited

U.S. PATENT DOCUMENTS

2014/0050134 A1   2/2014   Ahn et al.
2015/0117239 A1   4/2015   Lindoff et al.
(Continued)

FOREIGN PATENT DOCUMENTS

CN   105794245 A   7/2016
CN   110495203 A   11/2019
(Continued)

OTHER PUBLICATIONS

Sun, W. et al, "A QoS-based Resource Allocation Algorithm for D2D Communication", Journal of Hangzhou Dianzi University (Natural Sciences), vol. 37, No. 3, (with English abstract), May 15, 2017, 5 pages.
International Search Report issued Nov. 25, 2020 in PCT/CN2020/076233, filed on Feb. 21, 2020, 2 pages.
(Continued)

*Primary Examiner* — Jutai Kao
(74) *Attorney, Agent, or Firm* — Oblon, McClelland, Maier & Neustadt, L.L.P.

(57) ABSTRACT

The embodiments of the present disclosure relate to a communication processing method, a communication processing device and a computer storage medium. The communication processing method applied to a user equipment (UE) includes: when determining or predicting that In Device Coexistence (IDC) interference is present, reporting IDC interference indication information. Where, the IDC interference indication information is used to indicate an IDC-interference-affected transmission link in transmission links of the UE; and the transmission links of the UE include a sidelink, a cellular communication link and/or a satellite communication link of the UE.

17 Claims, 4 Drawing Sheets

When the UE determines or predicts that IDC interference is present, the UE reports IDC interference indication information; where the IDC interference indication information is used to indicate an IDC-interference-affected transmission link in transmission links of the UE; the transmission links of the UE include a sidelink, a cellular communication link and/or a satellite communication link of the UE — S11

(51) Int. Cl.
    *H04W 72/40*         (2023.01)
    *H04W 92/18*         (2009.01)

(56)            References Cited

U.S. PATENT DOCUMENTS

| 2015/0156783 | A1  | 6/2015  | Klang et al.         |
| 2015/0296526 | A1  | 10/2015 | Behravan et al.      |
| 2020/0068609 | A1* | 2/2020  | Wang ............... H04W 72/02 |
| 2021/0092662 | A1* | 3/2021  | Takahashi .......... H04W 72/541 |
| 2021/0153057 | A1* | 5/2021  | Zheng ............... H04B 17/345 |
| 2023/0033619 | A1* | 2/2023  | Lovlekar ............ H04W 72/541 |

FOREIGN PATENT DOCUMENTS

| CN | 110521230 A       | 11/2019 |
| WO | WO 2016/119287 A1 | 8/2016  |
| WO | WO 2020/030116 A1 | 2/2020  |

OTHER PUBLICATIONS

"In-device coexistence between NR V2X and LTE V2X", ZTE, Sanechips, 3GPP TSG RAN WG2 Meeting #104, R2-1816996, Spokane, USA, Nov. 12-16, 2018, Agenda item: 11.4.6, Document for: Discussion and Decision, 5 pages.

"TP to TR 36.791 (E-UTRA 2.4 GHz TDD Band for US): In-Device Coexistence Considerations for Unlicensed Operations in the 2.4 GHz ISM Band", Nokia, Globalstar, 3GPP TSG-RAN Working Group 4 Meeting #88-Bis, R4-1814101 (revision of R4-1813455), Chengdu, China, Oct. 8-Oct. 12, 2018, Agenda Item: 6.2.1, Document for: Approval, 7 pages.

Combined Chinese Office Action and Search Report issued Sep. 16, 2022 in Patent Application No. 202080000326.8 (with English machine translation), 31 pages.

Combined Chinese Office Action and Search Report issued Mar. 28, 2023 in Patent Application No. 202080000326.8 (with English machine translation and English translation of Category of Cited Documents), 24 pages.

* cited by examiner

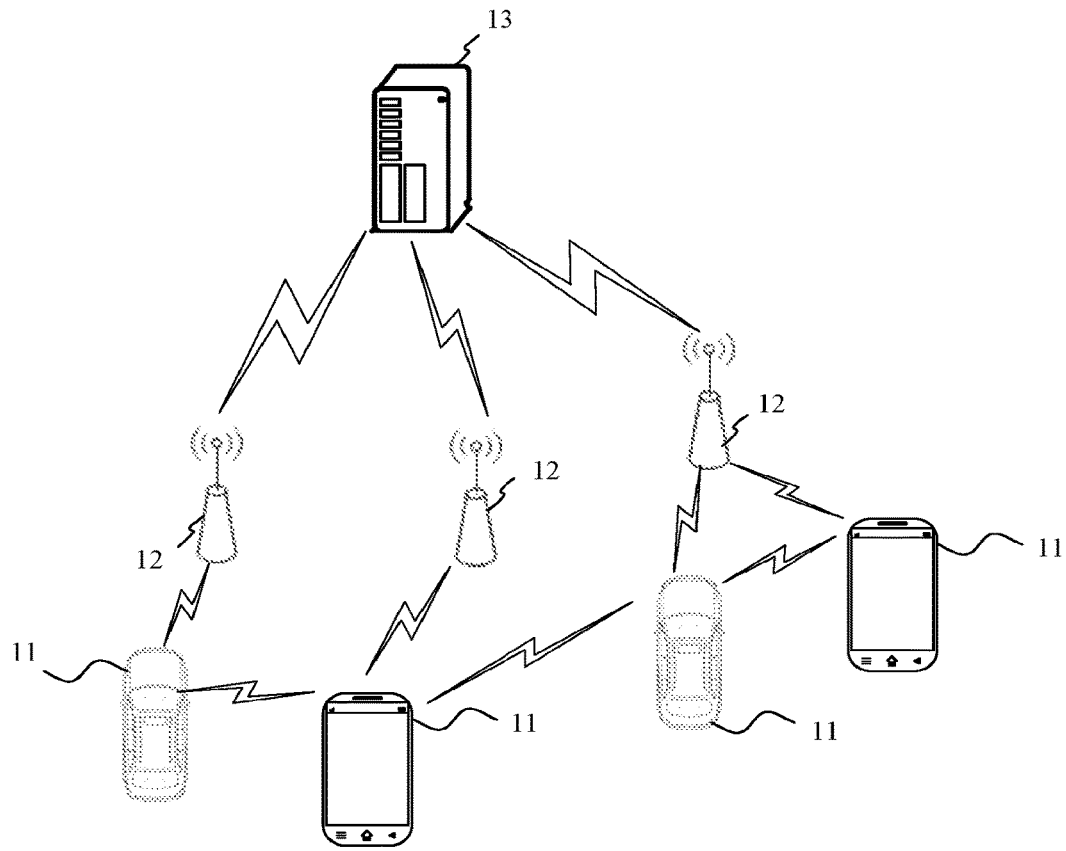

FIG.1

When the UE determines or predicts that IDC interference is present, the UE reports IDC interference indication information; where the IDC interference indication information is used to indicate an IDC-interference-affected transmission link in transmission links of the UE; the transmission links of the UE include a sidelink, a cellular communication link and/or a satellite communication link of the UE

COMMUNICATION PROCESSING METHOD AND DEVICE, AND COMPUTER STORAGE MEDIUM

CROSS-REFERENCE TO RELATED APPLICATIONS

This application is U.S. national phase of PCT international application No. PCT/CN2020/076233 filed on Feb. 21, 2020, the disclosure of which is incorporated herein by reference in its entirety.

BACKGROUND OF THE INVENTION

Field of the Invention

The present disclosure relates to communication technologies, and in particular to a communication processing method, a communication processing device and a computer storage medium.

Description of the Related Art

Sidelink is a direct communication technology employed for communication between User Equipment (UE) and UE. The sidelink includes two communication modes, where one is a communication mode based on base station resource scheduling, that is, resource adopted for transmitting information between UE and UE is scheduled by a base station. The other is that a UE autonomously selects a resource to perform information transmission between UE and UE, where selectable resources are pre-configured by a network and sent to the UE. For the communication mode based on base station scheduling, the scheduled resources may be included in an uplink carrier for a UE communicating with a base station. In this case, resource for communication between UE and UE and resource for communication between UE and base station can share the uplink carrier through time division or frequency division. The scheduled resource may be included in one dedicated carrier.

In the related arts, for the resource scheduling manner based on sharing uplink carrier, if a sidelink shares an uplink carrier with an air interface (e.g., Uu interface) for communication between a UE and a base station, the uplink carrier may be shared based on frequency division multiplexing (FDM). Thus, problems concerning In Device Coexistence (IDC) interference experienced on the sidelink and the Uu interface may be different. Furthermore, on the sidelink, the UE uses the uplink carrier to perform transmission and reception, which is different from the fact that, on the Uu interface, the UE uses a resource in the uplink carrier to perform only transmission. Therefore, the interference will be different. Thus, it is desirable to indicate IDC interference on a sidelink.

SUMMARY OF THE INVENTION

The present disclosure provides a communication processing method, a communication processing device and a computer storage medium.

According to a first aspect of embodiments of the present disclosure, there is provided a communication processing method, performed by a UE and that can include reporting IDC interference indication information when determining or predicting that IDC interference is present, where the IDC interference indication information is used to indicate an IDC-interference-affected transmission link in transmission links of the UE. Where the transmission links of the UE include at least one of a sidelink, a cellular communication link or a satellite communication link of the UE.

According to a second aspect of embodiments of the present disclosure, there is provided a communication processing method that can include receiving IDC interference indication information reported by a UE; determining an IDC-interference-affected transmission link in transmission links of the UE based on the IDC interference indication information, where the transmission links of the UE include a sidelink, a cellular communication link and/or a satellite communication link of the UE.

According to a third aspect of embodiments of the present disclosure, there is provided a communication processing device, performed by a UE and that can include a determining unit, configured to determine or predict whether IDC interference is present; a reporting unit, configured to, when determining or predicting that the IDC interference is present, report IDC interference indication information, where the IDC interference indication information is used to indicate an IDC-interference-affected transmission link in the transmission links of the UE, and the transmission links of the UE include a sidelink, a cellular communication link and/or a satellite communication link of the UE.

According to a fourth aspect of embodiments of the present disclosure, there is provided a communication processing device, being applied to a base station and that can include a communication unit, configured to receive IDC interference indication information reported by a UE; a processing unit, configured to determine an IDC-interference-affected transmission link in transmission links of the UE based on the IDC interference indication information; where the transmission links of the UE include a sidelink, a cellular communication link and/or a satellite communication link of the UE.

According to a fifth aspect of embodiments of the present disclosure, there is provided a communication processing apparatus, that can include a processor; a memory storing processor-executable instructions. Where the processor is configured to execute the executable instructions to perform the communication processing method according to any one of the above technical solutions applied to the UE.

According to a sixth aspect of embodiments of the present disclosure, there is provided a communication processing apparatus, that can include a processor, and a memory storing processor-executable instructions. The processor can be configured to execute the executable instructions to perform the communication processing method according to any one of the above technical solutions applied to the base station.

According to a seventh aspect of embodiments of the present disclosure, there is provided a non-transitory computer storage medium, storing executable instructions, where the executable instructions are executed by a processor to perform the communication processing method according to any one of the above technical solutions applied to the UE.

According to an eighth aspect of embodiments of the present disclosure, there is provided a non-transitory computer storage medium, storing executable instructions, where the executable instructions are executed by a processor to perform the communication processing method according to any one of the above technical solutions applied to the base station.

It should be understood that the above general descriptions and subsequent detailed descriptions are merely illustrative and explanatory rather than limiting of the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

FIG. 1 illustrates a structural schematic diagram of a wireless communication system according to an example of the present disclosure.

FIG. 2 illustrates a first flowchart of a communication processing method according to an example of the present disclosure.

DETAILED DESCRIPTION OF THE PREFERRED EMBODIMENTS

Figure 3:
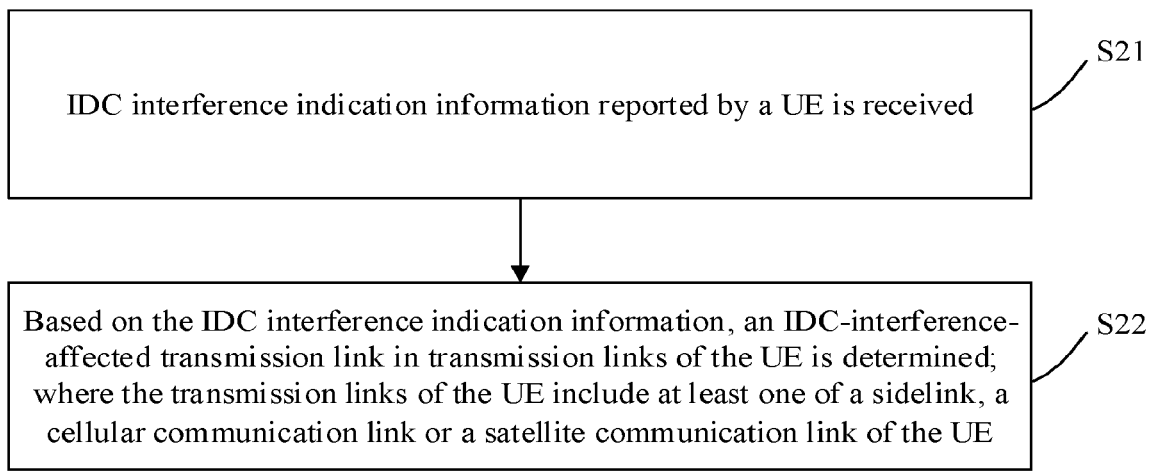
FIG. 3 illustrates a second flowchart of a communication processing method according to an example of the present disclosure.

Examples will be described in detail herein, with the illustrations thereof represented in the drawings. When the following descriptions involve the drawings, like numerals in different drawings refer to like or similar elements unless otherwise indicated. The implementations described in the following examples do not represent all implementations consistent with the present disclosure. Rather, they are merely examples of devices and methods consistent with some aspects of the present disclosure as detailed in the appended claims.

The terms used in the present disclosure are for the purpose of describing particular examples only, and are not to limit the present disclosure. Terms determined by "a", "the" and "said" in their singular forms in the present disclosure and the appended claims are also to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

FIG. 1 illustrates a structural schematic diagram of a wireless communication system according to an embodiment of the present disclosure. As shown in FIG. 1, the wireless communication system is a communication system based on cellular mobile communication technology and may include a plurality of terminals 11 and a plurality of base stations 12.

The terminal 11 may indicate a device that provides voice and/or data connectivity to the user. The terminal 11 may communicate with one or more core networks through a radio access network (RAN). The terminal 11 may be a terminal for internet of things, such as a sensor device, a mobile phone (or called cellular phone), and a computer having a terminal for internet of things. For example, the terminal 11 may be a device which is fixed, portable, pocket-sized, handheld, or computer-inbuilt or vehicle-mounted, such as station (STA), subscriber unit, subscriber station, mobile station, mobile, remote station, access point, remote terminal, access terminal, user terminal, user agent, user device, or UE. Optionally, the terminal 11 may also be a device of an unmanned aerial vehicle. Optionally, the terminal 11 may be a vehicle-mounted device, such as a trip computer having wireless communication function, or a wireless communication device externally connected to a trip computer. Optionally, the terminal 11 may be a roadside device, such as a road lamp, signal lamp or other roadside devices having wireless communication function.

The base station 12 may be a network side device in a wireless communication system. The wireless communication system may be any communication system, such as a fourth-generation mobile communication (4G) system, which is also called Long Term Evolution (LTE) system. Optionally, the wireless communication system may be a 5G system, which is also called new radio (NR) system or 5G NR system. Optionally, the wireless communication system may be a next generation system of the 5G system. An access network in the 5G system may be referred to as New Generation-Radio Access Network (NG-RAN). Optionally, the wireless communication system may also be referred to as Machine-Type Communication (MTC) system.

The base station 12 may be an evolved node base station (eNB) employed in the 4G system. Optionally, the base station 12 may be a base station adopting centralized distributed architecture (next generation node base station, gNB) in the 5G system. When adopting the centralized distributed architecture, the base station 12 usually includes a central unit (CU) and at least two distributed units (DU). In the central unit, protocol stacks of a Packet Data Convergence Protocol (PDCP) layer, a Radio Link Control (RLC) layer and a Media Access Control (MAC) layer are disposed; in the distributed unit, a physical (PHY) layer protocol stack is disposed. The specific implementations of the base station 12 are not limited to the embodiments of the present disclosure.

The base station 12 and the terminal 11 may establish wireless connection therebetween through wireless radio. In different implementations, the wireless radio may be a wireless radio based on the fourth generation mobile communication network technology (4G) standard; or, the wireless radio may be a wireless radio based on the fifth generation mobile communication network technology (5G) standard, for example, the wireless radio is a new radio; or, the wireless radio may be a wireless radio based on a next generation mobile communication network technology standard of 5G.

In some embodiments, the terminals 11 may establish end to end (E2E) connection therebetween, for example, in the scenarios such as vehicle to vehicle (V2V) communication, vehicle to Infrastructure (V2I) communication, and vehicle to pedestrian (V2P) communication and the like in vehicle to everything (V2X) communication.

In some embodiments, the above wireless communication system may further include a network management device 13.

A plurality of base stations 12 are connected to the network management device 13 respectively. The network management device 13 may be a core network device in the wireless communication system. For example, the network management device 13 may be a Mobility Management Entity (MME) in an Evolved Packet Core (EPC) network. Optionally, the network management device may be other core network device, such as Serving GateWay (SGW), Public Data Network GateWay (PGW), Policy and Charging Rules Function (PCRF), or Home Subscriber Server (HSS). The implementation morphology of the network management device 13 is not limited to the embodiments of the present disclosure.

In the related arts, for a device configured with modules for Long Term Evolution (LTE) and for Wi-Fi/Bluetooth/Global Navigation Satellite System (GNSS) at the same time, where modules for LTE and modules for Wi-Fi/Bluetooth/GNSS adopt different frequency bands, for example, modules for WIFI/Bluetooth/GNSS adopt Industrial Scientific Medical (ISM) frequency band, when the device transmits or receives signal(s), mutual interference between LTE frequency band and ISM frequency band may occur and prevent the device from receiving signal(s) correctly, thus affecting the device's normal work. For the problem concerning interference between LTE frequency band and ISM frequency band in the device, an IDC interference solution is introduced into the LTE. Specifically, when IDC interference occurs and the UE cannot solve it on itself, the UE may report IDC interference indication information to a network, where the IDC interference indication information indicates frequency bands which are affected and an interference direction (such as LTE interferes ISM, or ISM interferes LTE or mutually interferes). For uplink (UL) carrier aggregation and multi-rat dual connectivity, the UE reports an affected carrier combination (cross modulation interference and harmonic interference). The UE may also report time division multiplexing (TDM) auxiliary information so that the network can select proper parameters to adopt a TDM-based solution. The IDC interference reported by the UE may be ongoing IDC interference or IDC interference which is anticipated to occur. After receiving the IDC interference indication information of the UE, the network may adopt a solution based on TDM or FDM to solve the problem concerning IDC interference.

Sidelink is a direct communication technology employed for communication between UE and UE. The sidelink includes two communication modes, where one is a communication based on base station resource scheduling, that is, resource adopted for transmitting information between UE and UE is scheduled by a base station; the other is that a UE autonomously selects a resource to perform information transmission between UE and UE, where selectable resources are pre-configured by a network and sent to the UE. For the mode based on base station scheduling, the scheduled resource may be included in an uplink carrier used by a UE to communicate with a base station. In this case, the resource for communication between UE and UE, and the resource for communication between UE and base station can share the uplink carrier through time division or frequency division. The scheduled resource may also be included in one dedicated carrier.

In the related arts, for the resource scheduling manner based on sharing uplink carrier, if a sidelink shares an uplink carrier with an air interface (e.g., Uu interface) for communication between a UE and a base station, the uplink carrier may be shared based on FDM. Thus, problems concerning IDC interference experienced on the sidelink and the Uu interface may be different. Furthermore, on the sidelink, the UE uses the uplink carrier to perform transmission and reception, which is different from the fact that, on the Uu interface, the UE uses a resource in the uplink carrier to perform only transmission. Therefore, the interference will be different. Thus, it is desirable to indicate IDC interference on a sidelink.

However, by the existing IDC interference indication manner, the problem concerning interference on a sidelink cannot be indicated effectively. It is because, in a case that the existing IDC interference indication manner is adopted for frequency division duplexing (FDD), the UE indicates an affected frequency point by either a measurement identifier (ID) or frequency information of downlink carrier, which both represent an entirety of uplink carrier and downlink carrier in FDD, and then, a network determines whether the downlink carrier or the uplink carrier is interfered based on the interference direction. Since the uplink carrier would not be interfered, by indicating measurement ID/downlink frequency point and interference direction, the sidelink being interfered cannot be identified but be considered by the network as the downlink of LTE/NR being interfered.

Based on the above wireless communication system, the embodiments of the present disclosure are provided to show how to indicate IDC interference on a sidelink.

FIG. 2 illustrates a first flowchart of a communication processing method according to an example of the present disclosure. As shown in FIG. 2, the communication processing method can be performed by a UE and includes the following steps.

At step S11, when the UE determines or predicts that IDC interference is present, the UE reports IDC interference indication information; where the IDC interference indication information is used to indicate an IDC-interference-affected transmission link in transmission links of the UE; the transmission links of the UE include a sidelink, a cellular communication link and/or a satellite communication link of the UE. Thus, when the UE determines or predicts that IDC interference is present in a sidelink, the UE reports IDC interference indication information to notify the base station that the IDC-interference-affected transmission link in the transmission links of the UE includes the sidelink, such that the base station can determine a solution for solving the problem concerning IDC interference, for example, the base station can re-allocate a sidelink resource for the UE.

That is, the reported IDC interference indication information can indicate a problem concerning interference on the sidelink and the cellular communication link, a problem concerning interference on the sidelink and the satellite communication link and a problem concerning interference on the sidelink and the cellular communication link and the satellite communication link.

In some embodiments, the reported IDC interference indication information includes two or more information domains, where the information domains indicate different transmission links which are affected by IDC interference (also named as IDC-interference-affected transmission links). For example, the information domains include: a first information domain, used to indicate that the affected transmission link is a sidelink; a second information domain, used to indicate the affected transmission link is a cellular communication link and/or a satellite communication link.

In this way, the base station can distinguish the affected transmission links based on the information domains of the IDC interference indication information.

In some embodiments, the sidelink of the UE includes a sidelink allocated by a mode of base station scheduling sidelink resource. When the UE performing sidelink communication with a peer UE by using a resource allocated by the base station, if the UE determines or predicts that IDC interference is present and determines that the IDC interference is related to the sidelink, the UE sends the IDC interference indication information to the base station, such that the base station can re-allocate a sidelink resource for the UE.

In some embodiments, when the IDC-interference-affected transmission link includes the sidelink of the UE, the IDC interference indication information includes indication information of the IDC-interference-affected sidelink. Thus, the problem that the sidelink is affected by the IDC interference can be indicated by reporting the IDC interference indication information.

In some embodiments, the indication information of the IDC-interference-affected sidelink includes frequency information and/or information on interference direction of the IDC-interference-affected sidelink. The frequency information of the IDC-interference-affected sidelink includes an ARFCN of a frequency point corresponding to the IDC-interference-affected sidelink, or a measurement identifier of a frequency point corresponding to the IDC-interference-affected sidelink.

The interference direction includes sidelink being interfered or uplink being interfered. For example, the sidelink being interfered includes the sidelink being interfered by ISM and/or the sidelink being interfered by LTE/NR. For example, the uplink being interfered includes ISM being interfered by the sidelink and/or LTE/NR being interfered by the sidelink.

In some embodiments, the frequency information of the IDC-interference-affected sidelink includes frequency information of a shared uplink carrier in a case that the sidelink shares the uplink carrier with a Uu interface between the UE and the base station. That is, carrying the frequency information of the sidelink in the IDC interference indication information reported to the base station, includes: when the sidelink shares an uplink carrier with the Uu interface for communication between the UE and the base station, carrying the frequency information of the shared uplink carrier.

In some embodiments, the method may further include receiving IDC interference configuration information sent by the base station. Where the IDC interference configuration information includes the frequency information of the sidelink.

When determining or predicting that IDC interference is present, reporting the IDC interference indication information includes, when determining or predicting that IDC interference is present, based on the IDC interference configuration information, reporting IDC interference indication information which carries the frequency information of the IDC-interference-affected transmission link. In this way, the base station can determine the frequency information of the IDC-interference-affected sidelink based on the IDC interference indication information reported by the UE.

In some embodiments, before reporting the IDC interference indication information, the method may further include: receiving IDC interference reporting configuration information sent by the base station. Where reporting the IDC interference indication information includes: if the IDC interference reporting configuration information instructs reporting an IDC-interference-affected sidelink, when the sidelink is affected by IDC interference, reporting the IDC interference indication information which carries indication information of the sidelink; if the IDC interference reporting configuration information instructs not reporting an IDC-interference-affected sidelink, when the sidelink is affected by IDC interference, reporting the IDC interference indication information which does not carry indication information of the sidelink. In this way, the UE can determine whether to carry the indication information of the sidelink in the reported IDC interference indication information based on the IDC interference reporting configuration information sent by the base station.

In the above solution, before receiving the IDC interference reporting configuration information sent by the base station, the method may further include: sending capability information to the base station. Where the capability information indicates, when the sidelink is affected by IDC interference, whether the UE supports the IDC interference indication information to carry the indication information of the sidelink.

Receiving the IDC interference reporting configuration information sent by the base station includes receiving the IDC interference reporting configuration information which is sent by the base station based on the capability information. In this way, the UE sends the capability information to the base station such that the base station can send the IDC interference reporting configuration information to the UE based on the capability information, helping the UE to report the IDC interference indication information based on the IDC interference reporting configuration information.

In some embodiments, the indication information of the sidelink may further include first information to indicate whether a resource corresponding to the IDC-interference-affected sidelink is an autonomously-selected resource configured by the base station. In this way, the base station can determine whether the resource corresponding to the IDC-interference-affected sidelink is an autonomously-selected resource configured by the base station based on the first information, so as to help the base station to determine whether to re-allocate, for the UE, a sidelink resource for the UE to autonomously select.

In the technical solutions of the embodiments of the present disclosure, when it is determined or predicted that IDC interference is present, IDC interference indication information is reported, where the IDC interference indication information is used to indicate an IDC-interference-affected transmission link in transmission links of the UE; the transmission links of the UE include a sidelink, a cellular communication link and/or a satellite communication link of the UE. In this way, the interference problem on a sidelink can be effective indicated.

FIG. 3 illustrates a second flowchart of a communication processing method according to an example of the present disclosure. As shown in FIG. 3, the communication processing method can be performed by a network device, for example, a base station. The communication processing method includes the following steps.

At step S21, IDC interference indication information reported by a UE is received.

At step S22, based on the IDC interference indication information, an IDC-interference-affected transmission link in transmission links of the UE is determined; where the transmission links of the UE include at least one of a sidelink, a cellular communication link or a satellite communication link of the UE.

In this way, the base station can determine whether the IDC interference is related to the sidelink based on the IDC interference indication information reported by the UE, thus helping to determine a corresponding IDC interference solution according to different interference situations.

In some embodiments, before receiving the IDC interference indication information reported by the UE, the method may further include sending IDC interference reporting configuration information to the UE, where the IDC interference reporting configuration information indicates whether to report an IDC-interference-affected sidelink. Where receiving the IDC interference indication information reported by the UE includes: receiving the IDC interference indication information reported by the UE based on the IDC interference reporting configuration information. In this way, the UE can report the IDC interference indication information based on the IDC interference reporting configuration information.

In some embodiments, before distributing the IDC interference reporting configuration information to the UE, the method may further include: receiving capability information from the UE, where the capability information indicates whether the UE supports the IDC interference indication information to carry the indication information of the sidelink when the sidelink is affected by IDC interference; sending the IDC interference reporting configuration information based on the capability information. In this way, the base station can send the IDC interference reporting configuration information matching with the capability of the UE based on the capability information.

In some embodiments, before receiving the IDC interference indication information reported by the UE, the method may further include: sending IDC interference configuration information to the UE, where the IDC interference configuration information includes frequency information of the sidelink. Where receiving the IDC interference indication information reported by the UE includes: receiving the IDC interference indication information reported by the UE based on the IDC interference configuration information, where the IDC interference indication information carries frequency information of an IDC-interference-affected transmission link. In this way, the base station can determine the frequency information of the IDC-interference-affected sidelink based on the IDC interference indication information reported by the UE.

In some embodiments, determining the IDC-interference-affected transmission link in the transmission links of the UE based on the IDC interference indication information includes based on the frequency information of the IDC-interference-affected transmission link carried in the IDC interference indication information, determining the IDC-interference-affected transmission link of the UE. In this way, the base station can determine the frequency information of the IDC-interference-affected sidelink based on the IDC interference indication information reported by the UE so as to help to re-allocate a sidelink resource for the UE.

In the technical solutions of the embodiments of the present disclosure, the IDC interference indication information reported by the UE is received; based on the IDC interference indication information, the IDC-interference-affected transmission link in the transmission links of the UE is determined; the transmission links of the UE include a sidelink, a cellular communication link and/or a satellite communication link of the UE. In this way, based on the IDC interference indication information reported by the UE, whether the IDC interference is related to the sidelink is determined so as to help the base station to determine a corresponding IDC interference solution for interference situation.

Figure 4:
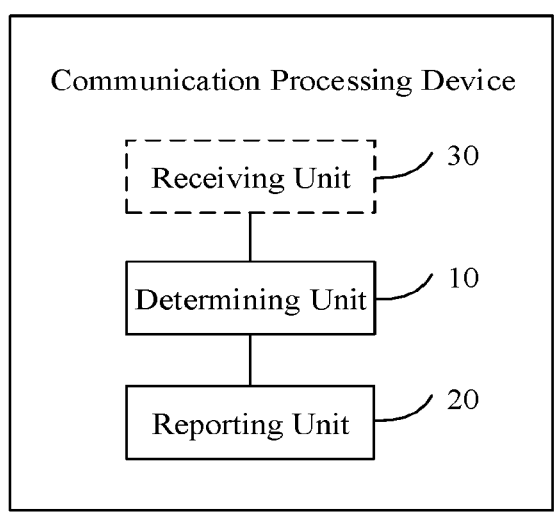
FIG. 4 illustrates a first block diagram of a communication processing device according to an example of the present disclosure.

FIG. 4 illustrates a first block diagram of a communication processing device according to an example of the present disclosure. The communication processing device can be performed by a UE. As shown in FIG. 4, the device includes a determining unit 10 and a reporting unit 20.

The determining unit 10 is configured to determine or predict whether IDC interference is present.

The reporting unit 20 is configured to, when determining or predicting that the IDC interference is present, report IDC interference indication information; where the IDC interference indication information is used to indicate an IDC-interference-affected transmission link in the transmission links of the UE; and the transmission links of the UE include a sidelink, a cellular communication link and/or a satellite communication link of the UE.

In the above solution, the sidelink of the UE includes a sidelink allocated by a mode of base station scheduling sidelink resource.

In the above solution, when the IDC-interference-affected transmission link includes the sidelink of the UE, the IDC interference indication information includes indication information of an IDC-interference-affected sidelink.

In the above solution, the indication information of the IDC-interference-affected sidelink includes at least one of frequency information of the IDC-interference-affected sidelink, or information on interference direction of the IDC-interference-affected sidelink.

In the above solution, the frequency information of the IDC-interference-affected sidelink includes: an ARFCN or a measurement identifier of a frequency point corresponding to the IDC-interference-affected sidelink.

In the above solution, the interference direction includes: sidelink being interfered or uplink being interfered.

In the above solution, the device may further include a receiving unit 30 configured to receive IDC interference configuration information which is sent by the base station, where the IDC interference configuration information includes frequency information of the sidelink.

The reporting unit 20 is configured to: when determining or predicting that IDC interference is present, based on the IDC interference configuration information, report the IDC interference indication information carrying frequency information of the IDC-interference-affected transmission link.

In the above solution, the reported IDC interference indication information includes two or more information domains, and where the information domains indicate different IDC-interference-affected transmission links respectively.

In the above solution, the receiving unit 30 may be further configured to: before reporting the IDC interference indication information, receive the IDC interference reporting configuration information sent by the base station; the reporting unit 20 is configured to: if the IDC interference reporting configuration information instructs reporting the IDC-interference-affected sidelink, when the sidelink is affected by IDC interference, report the IDC interference indication information carrying the indication information of the sidelink; if the IDC interference reporting configuration information indicates not reporting the IDC-interference-affected sidelink, when the sidelink is affected by IDC interference, report the IDC interference indication information carrying no indication information of the sidelink.

In the above solution, the reporting unit 20 may be further configured to: before receiving the IDC interference reporting configuration information sent by the base station, send the capability information to the base station, where the capability information indicates whether the UE supports the IDC interference indication information to carry the indication information of the sidelink when the sidelink is affected by IDC interference.

The receiving unit 30 may be further configured to: receive the IDC interference reporting configuration information which is sent by the base station based on the capability information.

In practical applications, the specific structures of the above determining unit 10 and reporting unit 20 and receiving unit 30 may be implemented by a central processing unit (CPU), a micro controller unit (MCU), a digital signal processor (DSP), or a programmable logic controller (PLC) or the like in the communication processing device or the UE to which the communication processing device is provided.

The communication processing device in this embodiment may be disposed at the UE.

Those skilled in the art should understand that the functions of the processing modules in the communication processing device of the embodiment of the present disclosure can be understood by referring to the relevant descriptions of the above communication processing method applied to the UE. The processing modules in the communication processing device of the embodiment of the present disclosure may be implemented by an analog circuit implementing the functions described in the embodiment of the present disclosure, or by running a software executing the functions described in the embodiment of the present disclosure on a terminal.

The communication processing device described in the embodiment of the present disclosure can effectively indicate the problem concerning interference on the sidelink.

Figure 5:
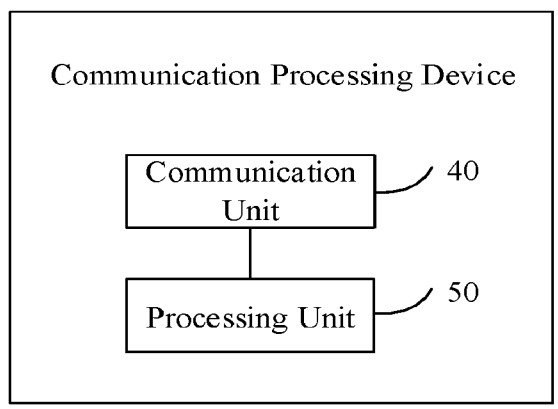
FIG. 5 illustrates a second block diagram of a communication processing device according to an example of the present disclosure.

FIG. 5 illustrates a second block diagram of a communication processing device according to an example of the present disclosure. The communication processing device can be performed by a base station. As shown in FIG. 5, the device includes a communication unit 40 and a processing unit 50.

The communication unit 40 is configured to receive IDC interference indication information reported by a UE.

The processing unit 50 is configured to, based on the IDC interference indication information, determine an IDC-interference-affected transmission link in transmission links of the UE; where the transmission links of the UE include a sidelink, a cellular communication link and/or a satellite communication link of the UE.

In some embodiments, the communication unit 40 is configured to: before receiving the IDC interference indication information reported by the UE, send IDC interference reporting configuration information to the UE; the IDC interference reporting configuration information indicates whether to report an IDC-interference-affected sidelink; the communication unit 40 may be further configured to: report the IDC interference indication information based on the IDC interference reporting configuration information.

In some embodiments, the communication unit 40 is configured to, before receiving the IDC interference indication information reported by the UE, send IDC interference configuration information to the UE; the IDC interference configuration information includes frequency information of the sidelink; the communication unit 40 may be further configured to: receive the IDC interference indication information reported by the UE based on the IDC interference configuration information, where the IDC interference indication information carries frequency information of an IDC-interference-affected transmission link.

In some embodiments, the processing unit 50 is configured to: based on the frequency information of the IDC-interference-affected transmission link which is carried in the IDC interference indication information, determine the IDC-interference-affected transmission link of the UE.

The specific manner in which the modules in the device of the above embodiment perform operations has already been described in details in the embodiments relating to the above method and will not be repeated herein.

In practical applications, the specific structures of the above communication unit 40 and processing unit 50 may be implemented by a CPU, an MCU, a DSP, or a PLC or the like in the communication processing device or the base station to which the communication processing device belongs.

The specific manner in which various modules in the device of the above embodiment perform operations has already been described in details in the embodiments of related methods and will not be repeated herein.

The communication processing device in this embodiment may be disposed at the base station.

Those skilled in the art should understand that the functions of various processing modules in the communication processing device according to the embodiment of the present disclosure can be understood by referring to the relevant descriptions of the above communication processing method applied to the base station. The various processing modules in the communication processing device of the embodiment of the present disclosure may be implemented by an analog circuit implementing the functions described in the embodiment of the present disclosure, or by running a software to execute the functions described in the embodiment of the present disclosure on a terminal.

The communication processing device described in the embodiment of the present disclosure can determine whether the IDC interference is related to a sidelink based on the IDC interference indication information reported by the UE, so as to help determine a corresponding IDC interference solution for interference situation.

Figure 6:
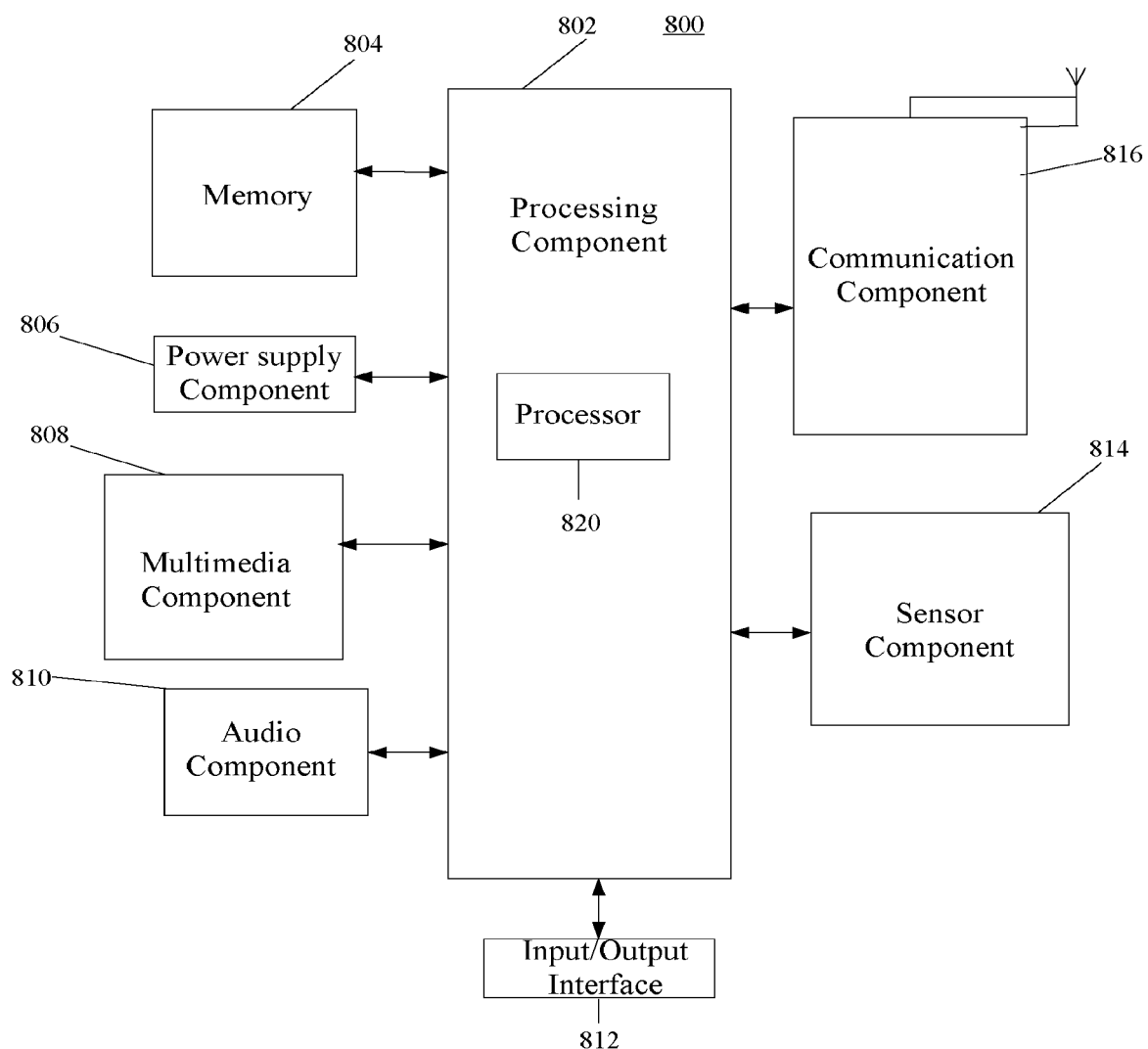
FIG. 6 illustrates a block diagram of an apparatus 800 for communication processing according to an example of the present disclosure.

FIG. 6 illustrates a block diagram of an apparatus 800 for communication processing according to an example of the present disclosure. For example, the apparatus 800 may be any commination device, such as a mobile phone, a computer, a digital broadcast terminal, a message transceiver, a game console, a tablet device, a medical device, a fitness device, a personal digital assistant, and the like.

As shown in FIG. 6, the apparatus 800 may include one or more of the following components: a processing component 802, a memory 804, a power supply component 806, a multimedia component 808, an audio component 810, an input/output (I/O) interface 812, a sensor component 814 and a communication component 816.

The processing component 802 generally controls overall operations of the apparatus 800, such as operations associated with display, phone calls, data communications, camera operations, and recording operations. The processing component 802 may include one or more processors 820 to execute instructions to complete all or part of the steps of the above methods. In addition, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operations of the apparatus 800. Examples of such data include instructions for any applications or methods operated on the apparatus 800, such as contact data, phonebook data, messages, pictures, videos, and so on. The memory 804 may be implemented by any type of volatile or non-volatile storage devices or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 806 supplies power for different components of the apparatus 800. The power supply component 806 may include a power supply management system, one or more power supplies, and other components associated with generating, managing and distributing power for the apparatus 800.

The multimedia component 808 includes a screen that provides an output interface between the apparatus 800 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 808 includes one or more front cameras and/or one or more rear cameras. When the apparatus 800 is in an operation mode, such as a shooting mode or a video mode, the front cameras and/or the rear cameras may receive external multimedia data. Each of the front cameras and rear cameras may be a fixed optical lens system or have a focal length and an optical zoom capability.

The audio component 810 is configured to output and/or input audio signals. For example, the audio component 810 includes a microphone (MIC) configured to receive an external audio signal when the apparatus 800 is in an operation mode, such as a call mode, a recording mode, and a voice recognition mode. The received audio signal may be further stored in the memory 804 or transmitted via the communication component 816. In some examples, the audio component 810 may also include a loudspeaker for outputting an audio signal.

The I/O interface 812 provides an interface between the processing component 802 and a peripheral interface module which may be a keyboard, a click wheel, a button, or the like. These buttons may include, but are not limited to a home button, a volume button, a start button, and a lock button.

The sensor component 814 includes one or more sensors for providing a status assessment in various aspects to the apparatus 800. For example, the sensor component 814 may detect an open/closed state of the apparatus 800, and the relative positioning of components, for example, the component is a display and a keypad of the apparatus 800. The sensor component 814 may also detect a position change of the apparatus 800 or a component of the apparatus 800, the presence or absence of a user in contact with the apparatus 800, the orientation or acceleration/deceleration of the apparatus 800 and a temperature change of the apparatus 800. The sensor component 814 may include a proximity sensor configured to detect the presence of nearby objects without any physical contact. The sensor component 814 may also include a light sensor, such as a Complementary Metal Oxide Semiconductor (CMOS) or Charge-coupled Device (CCD) image sensor, for use in imaging applications. In some examples, the sensor component 814 may also include an acceleration sensor, a gyro sensor, a magnetic sensor, a pressure sensor, or a temperature sensor.

The communication component 816 is configured to facilitate wired or wireless communication between the apparatus 800 and other devices. The apparatus 800 may access a wireless network based on a any communication standard, such as a Wi-Fi network, a second-generation (2G) network or a third-generation (3G) network, or a combination thereof. In an example, the communication component 816 may receive broadcast signals or broadcast associated information from an external broadcast management system via a broadcast channel. In an example, the communication component 816 may also include a near field communication (NFC) module to facilitate short range communication. For example, the NFC module may be implemented based on a radio frequency identification (RFID) technology, an infrared data association (IrDA) technology, an ultra-wideband (UWB) technology, a Bluetooth (BT) technology, and other technologies.

In an example, the apparatus 800 may be implemented by one or more application specific integrated circuits (ASICs), digital signal processors (DSPs), digital signal processing devices (DSPDs), programmable logic devices (PLDs), field programmable gate arrays (FPGA), controllers, microcontrollers, microprocessors or other electronic elements for performing the above communication processing method applied to a user terminal.

In an example, there is also provided a non-transitory computer storage medium, including executable instructions, for example, the memory 804 including executable instructions, where the executable instructions are executable by the processor 820 of the apparatus 800 to perform the method as described above. For example, the non-transitory computer storage medium may be a ROM, a Random Access Memory (RAM), a CD-ROM, a magnetic tape, a floppy disk and an optical data storage device and the like.

Figure 7:
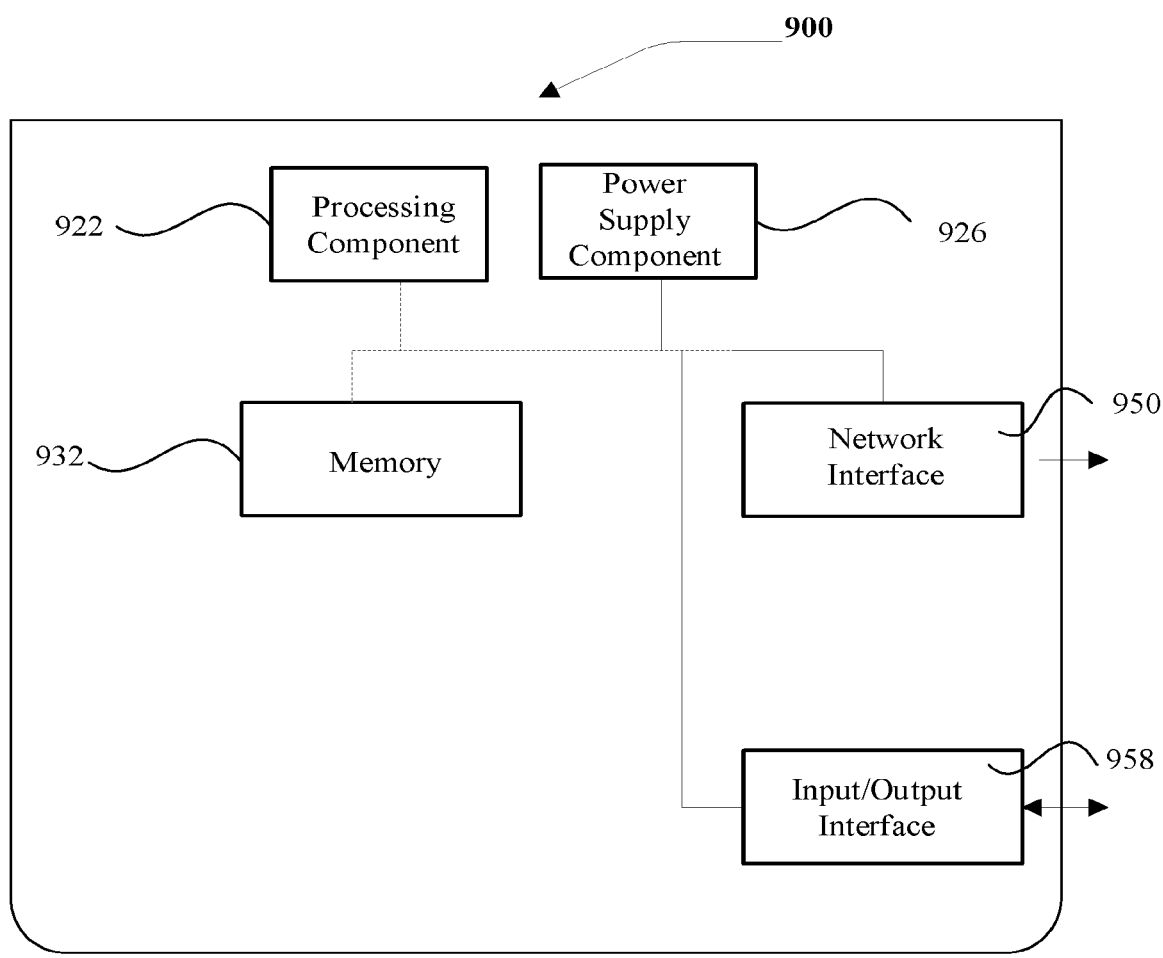
FIG. 7 illustrates a block diagram of an apparatus 900 for communication processing according to an example of the present disclosure.

FIG. 7 illustrates a block diagram of an apparatus 900 for communication processing according to an example of the present disclosure. For example, the apparatus 900 may be provided as a server. As shown in FIG. 7, the apparatus 900 may include a processing component 922 which may further include one or more processors and memory resources represented by a memory 932 for storing instructions executable by the processing component 922, for example, an application program. The application program stored in the memory 932 may include one or more modules, each of which corresponds to one set of instructions. Further, the processing component 922 may be configured to execute instructions to perform the above communication processing method applied to the base station.

The apparatus 900 further may include one power supply component 926 configured to execute power management for the apparatus 900, one wired or wireless network interface 950 configured to connect the apparatus 900 to a network, and one input/output (I/O) interface 958. The apparatus 900 may be operated based on an operating system which is stored in the memory 932, such as Windows Server™, Mac OS X™, Unix™, Linux™ and FreeBSD™ and the like.

The technical solutions provided by embodiments of the present disclosure may have the following beneficial effects. When it is determined or predicted that IDC interference is present, IDC interference indication information is reported, where the IDC interference indication information is configured to indicate an IDC-interference-affected transmission link in transmission links of the UE; the transmission links of the UE include a sidelink, a cellular communication link and/or a satellite communication link of the UE. In this way, the problem concerning interference on a sidelink can be effectively indicated.

The technical solutions recorded in the embodiments of the present disclosure can be combined arbitrarily in a case of no conflict.

Other implementations of the present disclosure will be apparent to those skilled in the art from consideration of the specification and practice of the present disclosure herein. The present disclosure is to cover any variations, uses, modification or adaptations of the present disclosure that follow the general principles thereof and include common knowledge or conventional technical means in the related art that are not disclosed in the present disclosure. The specification and embodiments are considered as examples only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A communication processing method, performed by a User Equipment (UE) and comprising:
 receiving In Device Coexistence (IDC) interference reporting configuration information sent by a base station;
 reporting IDC interference indication information when determining or predicting that IDC interference is present, wherein the IDC interference indication information is used to indicate an IDC-interference-affected transmission link in transmission links of the UE;
 wherein the transmission links of the UE comprise at least one of: a sidelink, a cellular communication link or a satellite communication link of the UE;
 wherein reporting the IDC interference indication information comprises:
 if the IDC interference reporting configuration information indicates reporting an IDC-interference-affected sidelink, when the sidelink is affected by IDC interference, reporting the IDC interference indication information which carries indication information of the sidelink;
 if the IDC interference reporting configuration information indicates not reporting an IDC-interference-affected sidelink, when the sidelink is affected by IDC interference, reporting the IDC interference indication information which does not carry indication information of the sidelink.

2. The method of claim 1, wherein the sidelink of the UE comprises a sidelink allocated by a mode of base station scheduling sidelink resource.

3. The method of claim 1, wherein the indication information of the IDC-interference-affected sidelink comprises at least one of: frequency information of the IDC-interference-affected sidelink, or information on interference direction of the IDC-interference-affected sidelink.

4. The method of claim 3, wherein the frequency information of the IDC-interference-affected sidelink comprises an absolute radio frequency channel number (ARFCN) or a measurement identifier of a frequency point corresponding to the IDC-interference-affected sidelink.

5. The method of claim 3, wherein the interference direction comprises sidelink being interfered or uplink being interfered.

6. The method of claim 3, wherein if the sidelink shares an uplink carrier with a Uu interface between the UE and the base station, the frequency information of the IDC-interference-affected sidelink comprises frequency information of the shared uplink carrier.

7. The method of claim 3, wherein the indication information of the IDC-interference-affected sidelink further comprises:
 first information, used to indicate whether a resource corresponding to the IDC-interference-affected sidelink is an autonomously-selected resource configured by a base station.

8. The method of claim 1, further comprising:
 receiving IDC interference configuration information sent by a base station, wherein the IDC interference configuration information comprises frequency information of the sidelink;
 reporting the IDC interference indication information when determining or predicting that IDC interference is present, comprises:
 when determining or predicting that IDC interference is present, based on the IDC interference configuration information, reporting IDC interference indication information which carries frequency information of the IDC-interference-affected transmission link.

9. The method of claim 1, wherein the reported IDC interference indication information comprises two or more information domains, and wherein the information domains indicate different IDC-interference-affected transmission links respectively.

10. The method of claim 1, wherein before receiving the IDC interference reporting configuration information sent by the base station, the method further comprises:
 sending capability information to the base station, wherein the capability information indicates whether the UE supports the IDC interference indication information to carry the indication information of the sidelink when the sidelink is affected by IDC interference;
 wherein receiving the IDC interference reporting configuration information sent by the base station comprises:
 receiving the IDC interference reporting configuration information which is sent by the base station based on the capability information.

11. A communication processing apparatus, comprising:
 a processor; and
 a memory storing executable instructions,
 wherein the processor is configured to execute the executable instructions to perform the communication processing method according to claim 1.

12. A non-transitory computer storage medium, storing executable instructions, wherein the executable instructions are executed by a processor to perform the communication processing method according to claim 1.

13. A communication processing method, comprising:
 sending In Device Coexistence (IDC) interference reporting configuration information to a User Equipment (UE), wherein the IDC interference reporting configuration information indicates whether to report an IDC-interference-affected sidelink;

receiving IDC interference indication information reported by the UE;

determining an IDC-interference-affected transmission link in transmission links of the UE based on the IDC interference indication information, wherein the transmission links of the UE comprise at least one of a sidelink, a cellular communication link or a satellite communication link of the UE;

wherein if the IDC interference reporting configuration information indicates reporting an IDC-interference-affected sidelink, the received IDC interference indication information carries indication information of the IDC-interference-affected sidelink;

if the IDC interference reporting configuration information indicates not reporting an IDC-interference-affected sidelink, the received IDC interference indication information does not carry indication information of the IDC-interference-affected sidelink.

14. The method of claim 13, wherein before receiving the IDC interference indication information reported by the UE, the method further comprises:

sending IDC interference configuration information to the UE, wherein the IDC interference configuration information comprises frequency information of the sidelink;

wherein receiving the IDC interference indication information reported by the UE comprises:

receiving the IDC interference indication information which is reported by the UE based on the IDC interference configuration information, wherein the IDC interference indication information carries frequency information of an IDC-interference-affected transmission link.

15. The method of claim 14, wherein determining the IDC-interference-affected transmission link in the transmission links of the UE based on the IDC interference indication information comprises:

based on the frequency information of the IDC-interference-affected transmission link which is carried in the IDC interference indication information, determining the IDC-interference-affected transmission link of the UE.

16. A communication processing apparatus, comprising:
a processor; and
a memory storing executable instructions,
wherein the processor is configured to execute the executable instructions to perform the communication processing method according to claim 13.

17. A non-transitory computer storage medium, storing executable instructions, wherein the executable instructions are executed by a processor to perform the communication processing method according to claim 13.

* * * * *